United States Patent Office 3,173,520
Patented Mar. 16, 1965

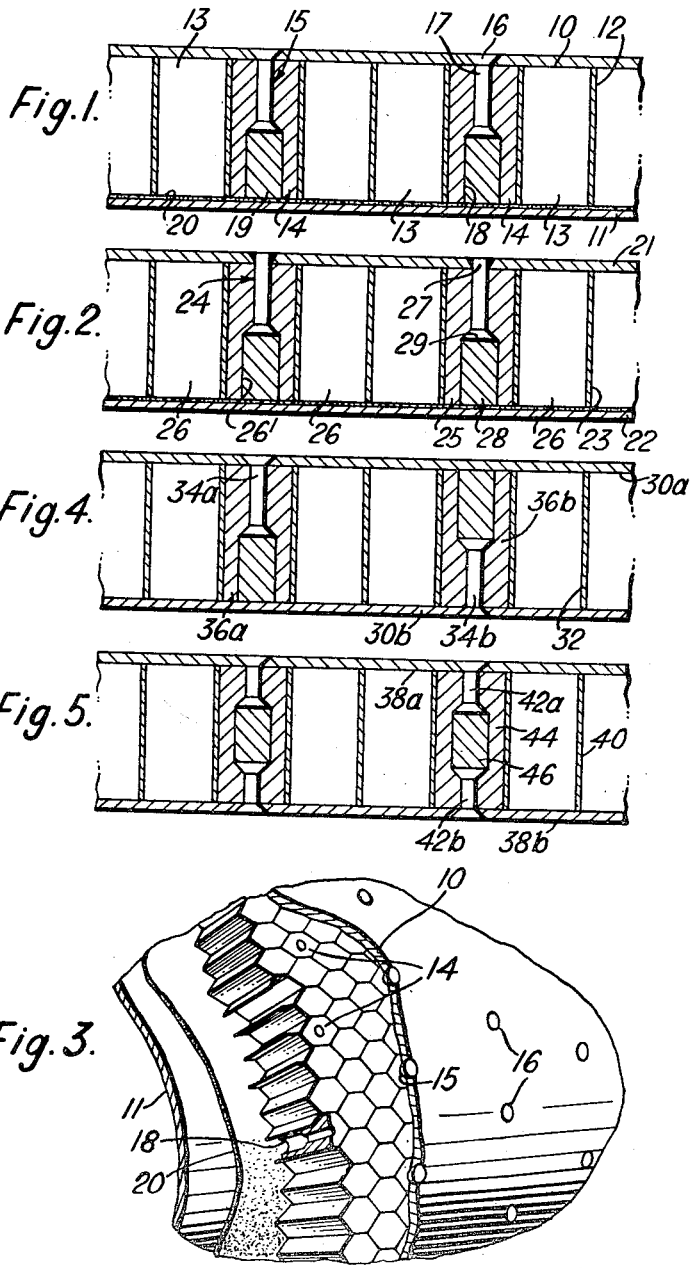

3,173,520
REINFORCED SKIN STRUCTURES
William Thoby Fisher, Bristol, England, assignor, by mesne assignments, to Bristol Aerojet Limited, Bristol, England
Filed Oct. 2, 1959, Ser. No. 843,976
Claims priority, application Great Britain, Oct. 6, 1958, 31,834/58
9 Claims. (Cl. 189—34)

This invention relates to reinforced skin structures.

According to the invention, a reinforced skin structure, comprising a metal skin and a honeycomb member with the skin extending across one end of the cells of the honeycomb member has a plurality of the cells provided with at least partial fillings, and the skin is attached to the honeycomb member by a plurality of metal tie-members each of which is connected at one end to the skin and at its other end engages a cell filling.

The metal tie-members may be either riveted to the metal skin or welded to it.

The cell fillings may be made from a thermosetting resin which is reinforced by a filler.

The structure may comprise a further skin which is bonded by adhesive to that side of the honeycomb member which is remote from the first-mentioned skin.

The skin which is bonded by adhesive to the honeycomb member may be made of any suitable material.

As an alternative, a honeycomb sandwich may have two metal skins each attached to the honeycomb member by metal tie-members engaging cell fillings. To provide a thermal barrier, either the tie-members for the two skins enter different cells, or the tie-members are substantially shorter than half the thickness of the honeycomb member.

By way of example, the invention will now be described with reference to the annexed diagrammatic drawings in which:

FIGURE 1 shows in section a part of a reinforced skin structure comprising two skins spaced apart by a honeycomb member one skin being riveted and the other skin being bonded by adhesive to the honeycomb member;

FIGURE 2 also shows in section a similar structure but with one skin welded instead of being riveted to the honeycomb member;

FIGURE 3 is a perspective view of the skin shown in FIGURE 1, progressively broken away to show the internal construction; and FIGURES 4 and 5 are sections of two alternative constructions.

Referring to FIGURE 1, a reinforced skin structure in the form of a honeycomb sandwich comprises two skins 10, 11 laterally spaced apart by an intermediate member 12 of honeycomb construction, with cells 13, which reinforces the skins 10, 11 against buckling or bending stresses. A selected number of the cells 13 of the honeycomb member are provided with thermally resistant and thermally insulating fillings 14, two of these fillings being shown in FIGURE 1, and the skin 10 is riveted to the honeycomb member 12 by means of metal tie-members 15 in the form of rivets whose heads 16 are countersunk in the skin 10 and whose shanks 17 engage the cell fillings 14. The other skin 11 is attached to the honeycomb member 12 by a suitable adhesive 20.

The structure described with reference to FIGURE 1 may be made in the following manner and with the following materials.

The honeycomb member 12 is of phenol formaldehyde resin reinforced by asbestos, and a thermosetting resin reinforced by a filler (such as an epoxy resin reinforced by asbestos powder) is injected into a plurality of chosen cells of the honeycomb member and cured to form a number of thermally insulating and thermally resistant fillings 14. The fillings are then each bored to receive a rivet, and counter bored to receive a dolly for riveting purposes. A steel skin 10 is placed over the honeycomb member 12, the assembly is put in a jig, and the skin is drilled through the bored holes in the fillings 14 and countersunk to receive the rivets 15. The steel rivets are inserted into the holes in the skin and fillings, and the ends of the rivet shanks 17 are enlarged by riveting in the normal manner, the dolly in each case being placed in the counterbore 18 which has been formed in the filling 14 for that purpose. After the skin 10 has been riveted in this manner to be filled cells of the honeycomb member, the empty counterbores 18 are preferably filled up with the plugs 19, for example of expanded resin cured in the cells. Finally, a thin sheet of adhesive resin is placed against the exposed side of the honeycomb member, the second skin 11, which may be steel, is held against the adhesive sheet, and heat and pressure are applied to bond the skin 11 to the honeycomb member.

Because the rivet shanks 17 do not contact the unriveted skin 11 but are insulated therefrom by the resin fillings 14 and plugs 19, a good thermal insulation is obtained between the skins 10, 11, and this may be increased by filling the remainder of the honeycomb cells 13 with a suitable low density material such as a foamed resin.

If desired, rivets comprising a shank which is expanded by withdrawal of a mandrel may be used, and the shape of the counterbores 18 modified accordingly to permit the removal of the mandrels.

In another modification, the counterbores 18 may be plugegd and the unriveted skin 11 bonded to the honeycomb member 12 before the rivet shanks 17 are enlarged, the dolly being held against the outer surface of the unriveted skin 11 so that the resin plugs 19 between the rivets 15 and the unriveted skin 11 act in effect as an extension of the dolly.

Alternatively the rivets may be reversed, their heads being within the counterbores 18 and their shanks projecting through the skin 10 and being enlarged.

Referring to FIGURE 2, the honeycomb sandwich comprises two steel skins 21, 22 laterally spaced apart by an intermediate member 23 of honeycomb construction, the skin 21 being welded by metal tie-members in the form of rivets 24 to suitable fillings 25 provided in some of the honeycomb cells 26, and the other skin 22 being bonded by adhesive to the honeycomb member 23.

In making the structure shown in FIGURE 2, a reinforced resin is injected into the cells which are to be filled, and is cured, and the resulting fillings 25 are bored and counterbored. The skin 21 is placed over the honeycomb member 23 and drilled to receive the shanks of rivets, and headed rivets 24 are then inserted into the bored fillings so that their heads 29 engage against the end walls of the counterbores 26′ and their shanks 27 pass through the drilled holes in the skin 21. The skin 21 and the rivet shanks 27 are thereupon welded together, after which operation the empty counterbores 26′ are preferably filled with plugs 28, for example of an expanded resin which is cured in the cells. Finally, a thin sheet or coating of adhesive resin is placed against the exposed side of the honeycomb member, the second steel skin 22 is held against the adhesive, and heat and pressure are applied to bond the skin 22 to the honeycomb member.

The welded skin may provide a better seal than the riveted skin of FIGURE 1 and this feature may be of advantage in certain applications of the invention, especially where the welded skin is the only skin in the structure.

The illustrated structures are suitable for use as external structural panels of aerial vehicles, with the metal skin outwards, because the outer skin which is exposed to kinetic heating is attached to the temperature-resistant honeycomb member by the steel rivets, whilst the inner skin which is bonded to the honeycomb member by a relatively temperature-sensitive adhesive is thermally insulated from the outer skin and from the embedded steel rivets.

FIGURE 4 shows a structure in which two metal skins 30a and 30b are attached to a honeycomb member 32 by rivets 34a and 34b connected to fillings 36a and 36b in different cells of the honeycomb member.

FIGURE 5 shows a structure in which two metal skins 38a and 38b are attached to a honeycomb member 40 by rivets 42a and 42b which are connected to opposite sides of the same fillings 44, the rivets being shorter than half the thickness of the honeycomb member 40, so that there is room for a plug 46 to provide thermal insulation. Assembly of this structure may be facilitated by the use of so-called "blind" rivets, the inner ends of which are enlarged by operation of an external tool.

I claim:

1. A reinforced skin structure, comprising a metal skin and a honeycomb member with the skin extending across one end of the cells of the honeycomb member, in which a plurality of the cells have at least partial fillings fixed in these cells, and the skin is fixedly secured to the honeycomb member entirely by means of a plurality of metal tie members each of which is connected at one end to the skin and at its other end engages a cell filling.

2. A structure according to claim 1 in which a further skin is secured by adhesive to the side of the honeycomb member remote from the first skin.

3. A structure according to claim 2 in which the honeycomb member is of heat-resistant resin with fibre reinforcement.

4. A structure according to claim 3 in which the honeycomb member is of phenol formaldehyde resin reinforced by asbestos.

5. A structure according to claim 2 in which the cell fillings are of thermoset resin reinforced by a filler.

6. A structure according to claim 1 in which a further skin of metal is secured by further metal tie-members to fillings in other cells of the honeycomb member, on the side of the honeycomb member remote from the first skin.

7. An aerial vehicle having external structural panels constituted by structure according to claim 1, the metal skin being outwards.

8. A structure according to claim 1, in which in each filling there is a bore with a step facing away from the skin; and associated with each filling there is a hole in the skin in alignment with the bore, and a fastener having a shank extending through the hole and the bore; the fastener also including a head engaging the skin and an enlargement of the shank engaging the step.

9. A structure according to claim 1, in which in each filling there is a bore with a step facing away from the skin; and associated with each filling there is a hole in the skin in alignment with the bore, and a fastener having a shank extending through the hole and the bore; the fastener also including a head engaging the step, and a weld connection between the skin and the shank.

References Cited by the Examiner
UNITED STATES PATENTS

| | | | |
|---|---|---|---|
| 355,274 | 12/86 | Manly et al. | 29—526 |
| 1,779,814 | 10/30 | Heimberger. | |
| 2,509,020 | 5/50 | Stauffer et al | 29—470.7 |
| 2,609,315 | 9/52 | Engel et al. | |
| 2,880,830 | 4/59 | Rohe | 189—34 |
| 2,900,713 | 8/59 | Young | 29—475 |
| 2,961,760 | 11/60 | Horton et al. | |
| 2,967,593 | 1/61 | Cushman | 189—34 |
| 3,030,705 | 4/62 | Gill | 29—526 |
| 3,057,057 | 10/62 | Langhans | 29—475 |

JACOB L. NACKENOFF, *Primary Examiner.*

W. I. MUSHAKE, JOEL P. REZNEK, *Examiners.*